US007886968B2

(12) United States Patent
Shoemaker

(10) Patent No.: US 7,886,968 B2
(45) Date of Patent: Feb. 15, 2011

(54) CLOSE-CONTACT-CONFIRM-THEN-COMMUNICATE DATA EXCHANGE METHODS AND APPARATUS

(75) Inventor: Austin Shoemaker, Stanford, CA (US)

(73) Assignee: Austin William Shoemaker, Sarosta, FL (US)

( * ) Notice: Subject to any disclaimer, the term of this patent is extended or adjusted under 35 U.S.C. 154(b) by 0 days.

(21) Appl. No.: 12/267,498

(22) Filed: Nov. 7, 2008

(65) Prior Publication Data
US 2009/0250513 A1 Oct. 8, 2009

Related U.S. Application Data

(60) Provisional application No. 60/986,587, filed on Nov. 8, 2007.

(51) Int. Cl.
*G06K 5/00* (2006.01)
(52) U.S. Cl. ...................................... 235/380
(58) Field of Classification Search ............... 235/380, 235/382, 375, 382.5, 383, 385; 345/156; 455/41.2, 406, 408, 435.1, 115.2
See application file for complete search history.

(56) References Cited

U.S. PATENT DOCUMENTS

| 6,874,037 | B1 * | 3/2005 | Abram et al. ............... 709/248 |
| 7,207,477 | B1 * | 4/2007 | Ramachandran ............ 235/379 |
| 7,242,923 | B2 * | 7/2007 | Perera et al. ............... 455/411 |
| 7,398,920 | B2 * | 7/2008 | Namekawa et al. ......... 235/380 |
| 2003/0162556 | A1 * | 8/2003 | Libes ......................... 455/507 |
| 2004/0125077 | A1 * | 7/2004 | Ashton ....................... 345/156 |
| 2005/0130706 | A1 | 6/2005 | Yamamoto |
| 2005/0250444 | A1 * | 11/2005 | Zinn et al. ................. 455/41.2 |
| 2006/0117017 | A1 | 6/2006 | Kawaguchi et al. |
| 2007/0202860 | A1 | 8/2007 | Hayashi |

FOREIGN PATENT DOCUMENTS

| EP | 1367532 A1 | 12/2003 |
| JP | 10-145987 A | 5/1998 |

OTHER PUBLICATIONS

"International Search Report", Issued in PCT Application No. PCT/US2008/082875; Mailing Date: Jan. 23, 2009.
"Written Opinion", Issued in PCT Application No. PCT/US2008/082875; Mailing Date: Jan. 23, 2009.
"International Preliminany Report on Patentability", Issued in PCT Application No. PCT/US2008/082875; Mailing Date: May 20, 2010.

* cited by examiner

*Primary Examiner*—Seung H Lee
(74) *Attorney, Agent, or Firm*—IP Strategy Group, P.C.

(57) ABSTRACT

Portable wireless devices and methods for conducting at least part of an electronic transaction with a target electronic device are disclosed. The portable wireless device includes a detector configured to ascertain whether the portable wireless device is in close proximity with the target electronic device and a data transmission circuit configured for transmitting data between the if the close proximity is detected, the transmitting is performed by one of wireless data transmission method and direct contact data transmission method.

20 Claims, 17 Drawing Sheets

CLOSE-CONTACT-CONFIRM-THEN-COMMUNICATE DATA EXCHANGE METHODS AND APPARATUS

This application claims priority under 35 USC 119(e) to a provisional application entitled "CLOSE-CONTACT-CONFIRM-THEN-COMMUNICATE DATA EXCHANGE METHODS AND APPARATUS", Application No. 60/986,587, filed Nov. 8, 2007.

BACKGROUND OF THE INVENTION

Wireless electronic devices, particularly portable wireless electronic devices, have long been employed to exchange data. Because of their small form factor and their wireless capability, portable wireless electronic devices have been widely employed to conduct transactions. As the term is employed herein, a transaction encompasses the act of furnishing electronic data to accomplish some commercial, technical and/or social purposes. As an example of a commercially-oriented transaction, the transfer of electronic payment data in exchange for goods or services represents a type of transaction routinely conducted by smart card users and/or users of cellular phones equipped with electronic payment capability.

As an example of a technically-oriented transaction, a portable wireless electronic device may be employed to furnish authentication data to authenticate the identity of the user of the portable wireless electronic device. Such authentication, once successfully accomplished, would then permit the user of the authenticating portable wireless electronic device to, for example, log on to a computer, open a door, start a car, receive a document, etc. As an example of a socially-oriented transaction, the user of a portable wireless electronic device may employ the portable wireless electronic device to provide contact information to another electronic device that belongs to another user, thereby accomplishing the electronic equivalent of exchanging business cards.

As more and more users come to rely on portable wireless electronic devices to conduct transactions, issues such as security have become critical. While it is highly convenient to carry and use a portable wireless electronic device for the purpose of conducting transactions, there are serious security concerns. For example, since the wireless transmission medium is omni-directional, there is always a risk that someone may employ another wireless device to "hack" into the portable wireless electronic device and gain unauthorized access to the data therein. In this case, confidential electronic data such as electronic payment data or personal data may be transmitted to the hacking device, or may be caused to be transmitted to the hacking device, without the full knowledge and/or consent of the owner of the user or the portable wireless electronic device. This is because often times, the user may not even be aware that an unauthorized data transfer has taken place.

Even if the exchange of electronic data is performed with the intended party, the wireless medium is highly susceptible to eavesdropping. For example, while the portable wireless electronic device exchanges data with its intended target electronic device, eavesdropping equipment may be employed for snooping on the data being transferred. If the transferred data includes Financial information, log-in information and/or any other confidential information, another party may be able to intercept and employ such intercepted confidential data for illicit purposes at a later time.

DETAILED DESCRIPTION OF EMBODIMENTS

Figure 1:
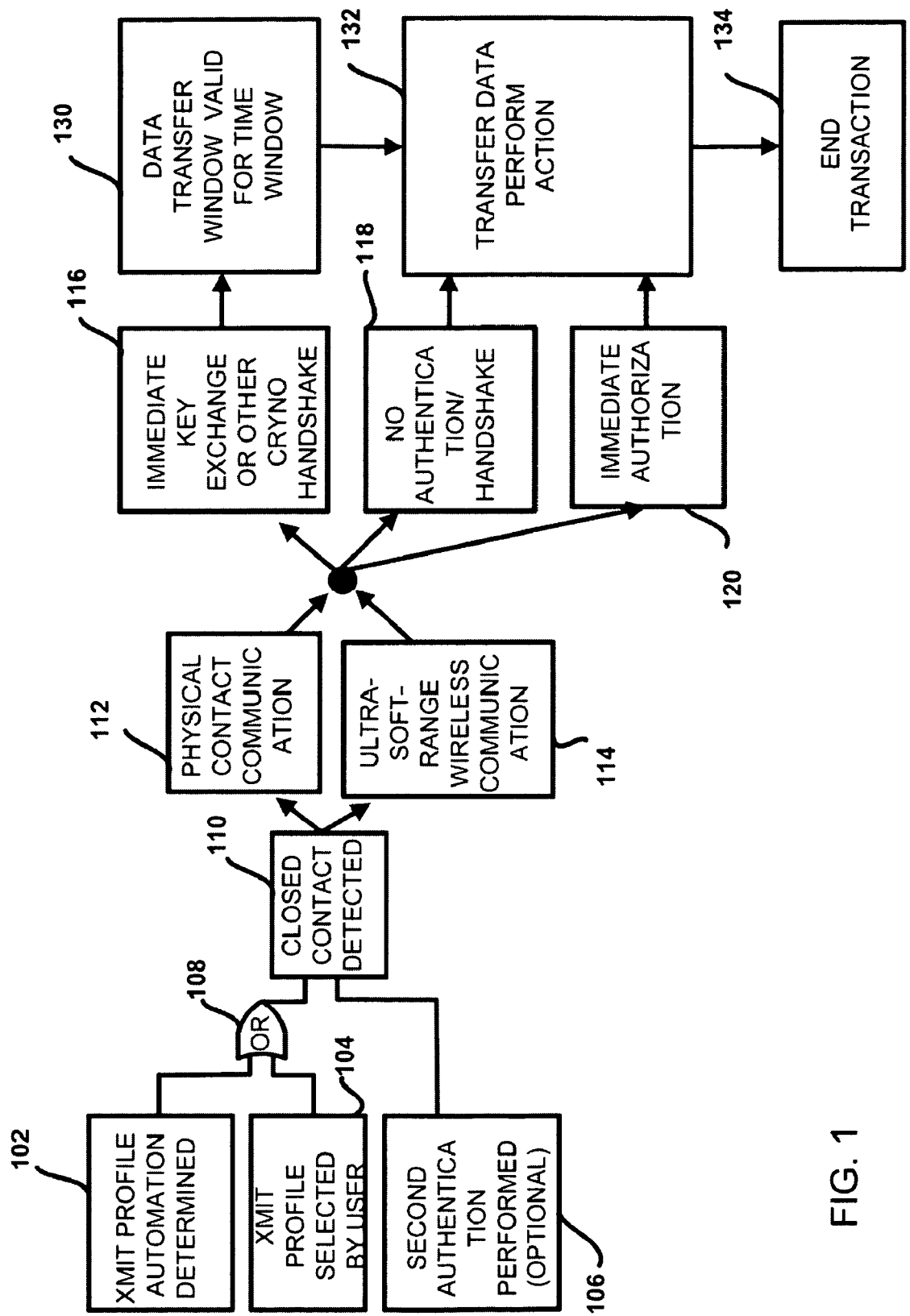
FIG. 1 shows, in accordance with an embodiment of the present invention, a flowchart Of the Close-Contract Confirm-Then-Communicate (CCCTC) method.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Embodiments of the invention relate to methods and apparatus for ensuring data security when transacting using a portable wireless electronic device. In an embodiment, there is provided a Close-Contact Confirm-Then-Communicate (CCCTC) methodology whereby a close contact (defined herein as a physical contact or close proximity) is required as part of, or prior to, data transmission. The CCCTC requirement, along with various optional security enhancements discussed herein, offers a highly secure data transmission arrangement in various usage scenarios, examples of which are also discussed herein.

Close contact, as the term is employed herein, encompasses direct physical touching by at least a portion of the CCCTC portable wireless device to a target device, in one or more embodiments of the invention. Close contact, in one or more other embodiments, may also encompass being in sufficiently close proximity to the target device so as to affirmatively evidence an intent to communicate. The close proximity range represents a range that, for substantially all practical purposes, eliminates the risk of communicating accidentally or coincidentally with an unintended target device that is simply nearby. For most practical applications, the close proximity range required to satisfy the "close contact" requirement between the CCCTC portable wireless device and the other electronic device capable of receiving the data transmission is no more than a few inches to avoid the unintentional fulfillment of the "close contact" requirement. The close proximity range is defined, in one or more embodiments, to be between about almost touching (e.g., less than about 0.1 inch) to about 6 inches, more preferably between almost touching and about 4 inches, and preferably between almost touching and about 2 inches. Beyond the designed close proximity range for a given CCCTC portable wireless device, the "close contact" requirement is not satisfied and communication is inhibited until the "close contact" requirement is satisfied.

Actual touch may be detected by a change in physical or electrical characteristics of an appropriate detector circuit on the CCCTC portable wireless device. For example, a change in impedance or voltage or current may be experienced by an appropriate detector circuit on the CCCTC portable wireless device upon touching another electronic device capable of receiving the data transmission, which experience may be defined as an appropriate touch.

Close proximity detection may be accomplished using an appropriate electromagnetic sensor and/or radio signals, for example. In one or more embodiments, the other electronic device with which the CCCTC portable wireless device is seeking to establish communication with may be equipped with an appropriate transmitter to aid in close proximity sensing by a sensor on the CCCTC, or vice versa. Transmitters and sensors for sensing close proximity as well as sensors for sending direct physical contact are available in the art and/or known to those skilled in the art.

The features and advantages of embodiments of the invention may be better understood with reference to the figures and discussions that follow. FIG. 1 shows, in accordance with an embodiment of the present invention, a flowchart of the Close-Contact Confirm-Then-Communicate (CCCTC) method. In block 102, the user may select one of the profiles to determine the data to be transmitted. For example, the profile may relate to transaction data for completing a transaction (such as credit card information), contact data (e.g., name, address, phone), access code to gain entry or to log in, or almost any data predefined for selection by the user.

Alternatively (as represented by the "OR" symbol 108), the transmit profile may be automatically selected (104) given the context of the communication. For example, upon being in close contact with another electronic device that is provisioned with the CCCTC capability, one of the CCCTC portable wireless devices would initiate the communication, and the other CCCTC portable wireless device may automatically determine, based on the data received, the appropriate data to respond. As yet another example, a default profile may be automatically selected to permit the user of the CCCTC portable wireless device to transmit some predefined information (such as contact data involving name, email address, and/or phone number for example).

Optionally, in block 106, a secondary authentication may be employed in order to authenticate the user. This secondary authentication represents a type of security enhancement and will be discussed later herein in connection with FIG. 2A-2D.

If close contact is detected in block 110 (and if secondary authentication, if required, is satisfied in block 106), the data associated with the profile selected in one of blocks 102 and 104 will be selected for transmit. Depending on specific system implementation, a close contact may be predefined as an actual touch (112) or an ultra-short range wireless communication (114).

Generally speaking, once the "close contact" requirement is satisfied (via either direct touch or close proximity as the term is defined herein), communication may take place in at least one of three ways. In block 120, the detection of close contact is the communication itself, and may result in an immediate action being performed or an authorization/authentication being understood by the other electronic device or even by the CCCTC portable wireless device. Thus, the action that requires the close contact detection prior to initiation is performed in block 132 and then completes in block 134. In block 118, the detection of close contact represents a handshake signal that starts the transfer of data between the CCCTC portable wireless device and the other electronic device. This subsequent transfer of data may be performed using a direct contact or a wireless transmission method, which may be a close contact wireless transmission or a wireless transmission that can take place over a longer distance once the close contact requirement (via close proximity detection or direct contact detection) has been satisfied. The performance of the data transfer/action is shown in block 132, and the data transfer/action is completed in block 134. Thus, block 118 and 120 may be viewed as situation wherein the detection of the close contact may server as a trigger for some other action.

In an embodiment, the encryption keys may be generated for each transaction (e.g., upon detection of the close contact). In another embodiment, the encryption keys may be generated in advance and pre-stored in the CCCTC portable wireless device. The transmission of the one or more encryption keys may take place via a close contact transmission paradigm (i.e., via direct contact data transfer or close proximity data transfer). Since the close contact is required for the transmission of the one or more encryption keys, such encryption keys are protected from snooping by nearby electronic devices. Since encryption keys tend to be fairly short in length (at least having fewer bits of data than the actual data to be transmitted in most situations) and may take place fairly rapidly, such exchange of encryption keys (116) is not greatly inconvenienced by the requirement of being in close contact. The exchange of encryption key (116) by close contact transmission may also be considered one of the security enhancements to the basic close-contact-then-confirm-then-communicate methodology.

Once the encryption keys are exchanged, a data transfer time window (130) may optionally be employed to provide further security. The data transfer time window constrains the subsequent data transfer such that if the data transfer time window expires before the subsequent data transfer starts (in an embodiment), the subsequent data transmission is inhibited. In an embodiment, the data transfer time window may be implemented by an encryption key that has a limited valid lifetime. In another embodiment, the data transfer time window may be implemented by a circuit that inhibits data transmission from the CCCTC portable wireless device or inhibits data receiving by the CCCTC portable wireless device when a timer that tracks the data transfer time window expires.

If the subsequent data transfer is permitted (e.g., the subsequent data transfer starts within the data transfer window or no data transfer time window is implemented), the CCCTC portable wireless device and the other device may exchange encrypted data using a close contact transmission paradigm (i.e., via direct contact data transfer or close proximity data transfer) or using a wireless communication technology that permits a longer range transmission, for example. The performance of the data transfer/action is shown in block 132, and the data transfer/action is completed in block 134.

As can be appreciated from the foregoing, the close contact requirement act as a gating action to prevent data transmission from taking place. In an embodiment, being in close contact also facilitates the transfer of highly sensitive data, such as the encryption keys. Once the encryption keys are exchanged, data transmission may take place over longer distances using encrypted data. Security enhancements and various use scenarios are discussed in the following sections of this disclosure to further elaborate on various aspects of certain embodiments of the invention.

Figure 2A:
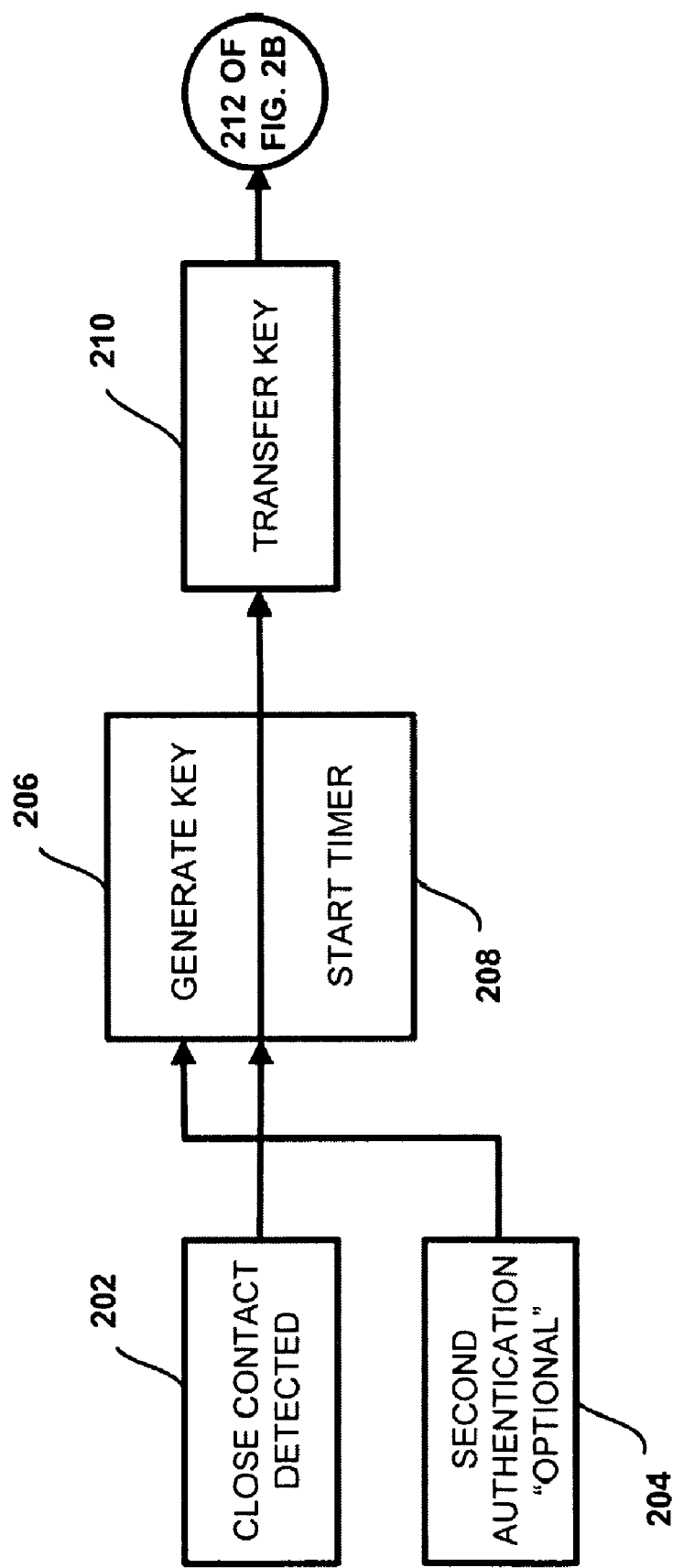
FIGS. 2A-2D show some of the security enhancement techniques that may be employed in accordance with embodiments of the invention.
Figure 2B:
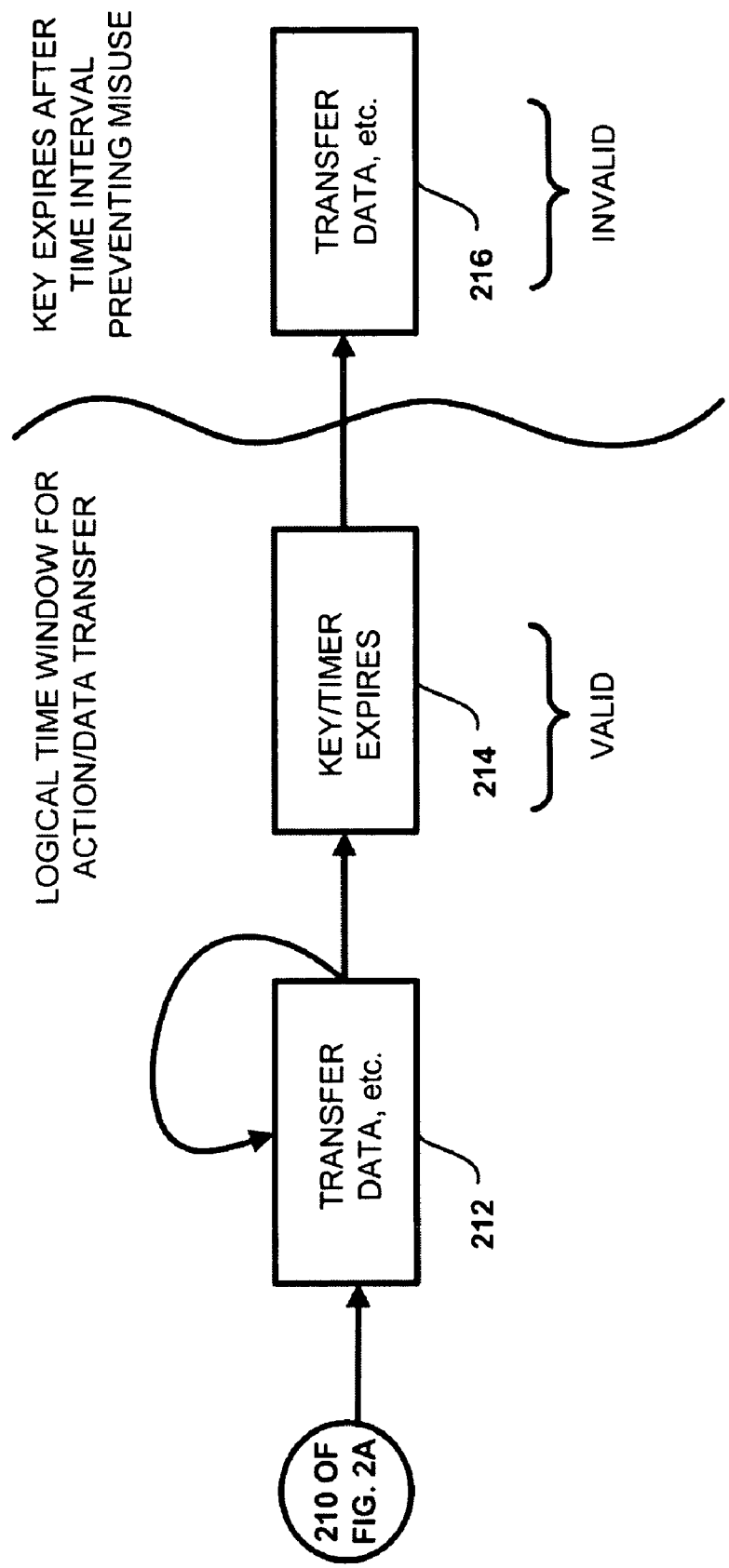

FIG. 2A shows, in accordance with an embodiment of the present invention, the implementation of a data transfer time window to improve security. If close contact is detected (block 202) and secondary authentication is satisfied (block 204), encryption keys may be exchanged (block 206), which exchange also starts a timer (block 208). The key transfer itself is shown in block 210. The timer (or limited lifetime encryption key) defines the time during which data transfer (212) is valid.

At some point, the encryption key expires or the transmission timer expires (block 214), and data transfer is no longer valid. In an embodiment, if data transmission starts before the expiration of the encryption key and/or the transmission timer, the data transmission is allowed to finish. At any rate, new data transmission (such as a new data transfer session shown by block 216) is inhibited after the expiration of the encryption key or the transmission timer. As can be appreciated from the foregoing, the implementation of a data transfer time window improves security as such window prevents a close contact detection with one electronic device from inadvertently enabling data transmission to another electronic device if some time has passed between the detection of the close contact and the subsequent data transmission.

Figure 2C:
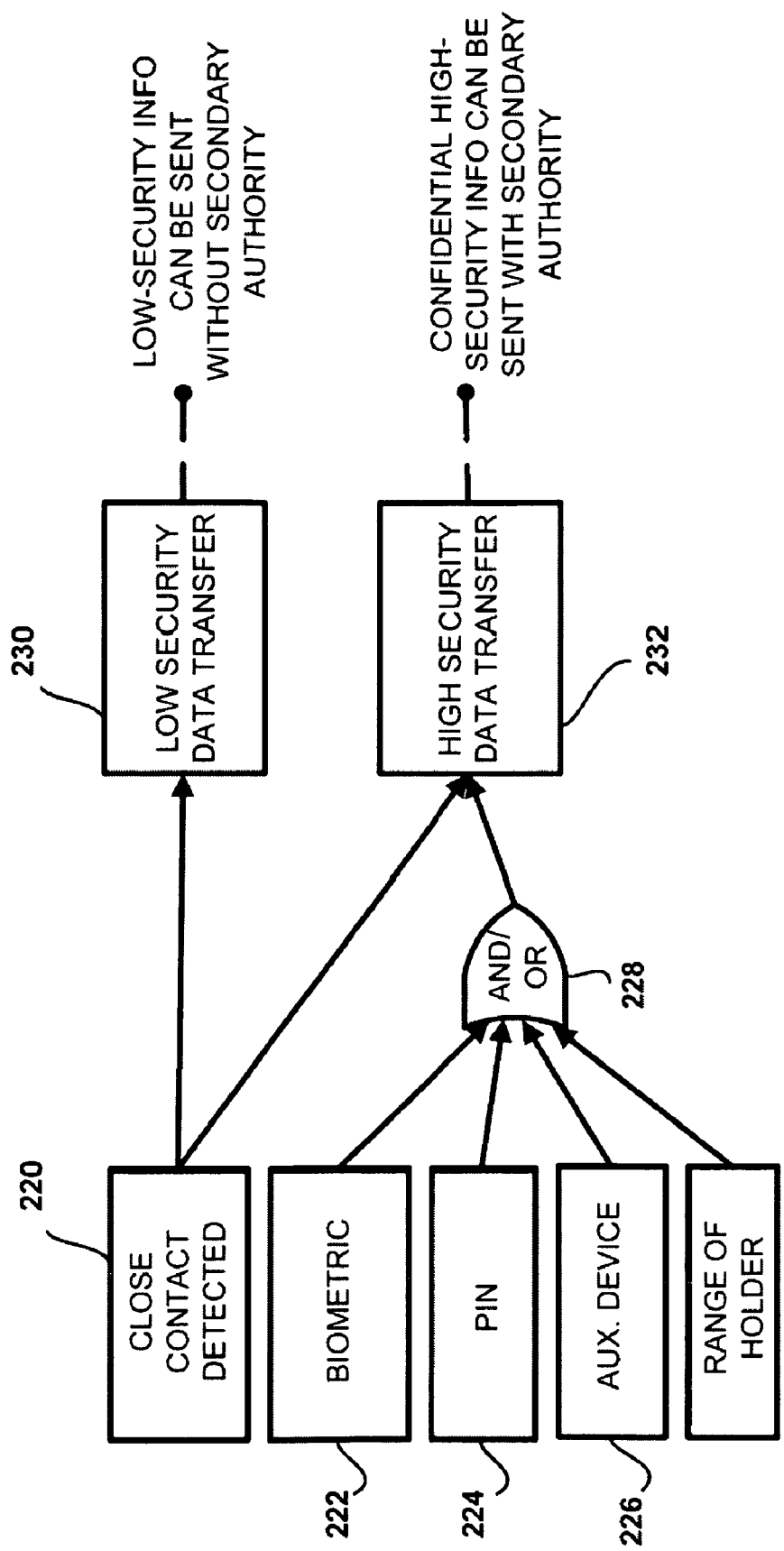
Figure 2D:
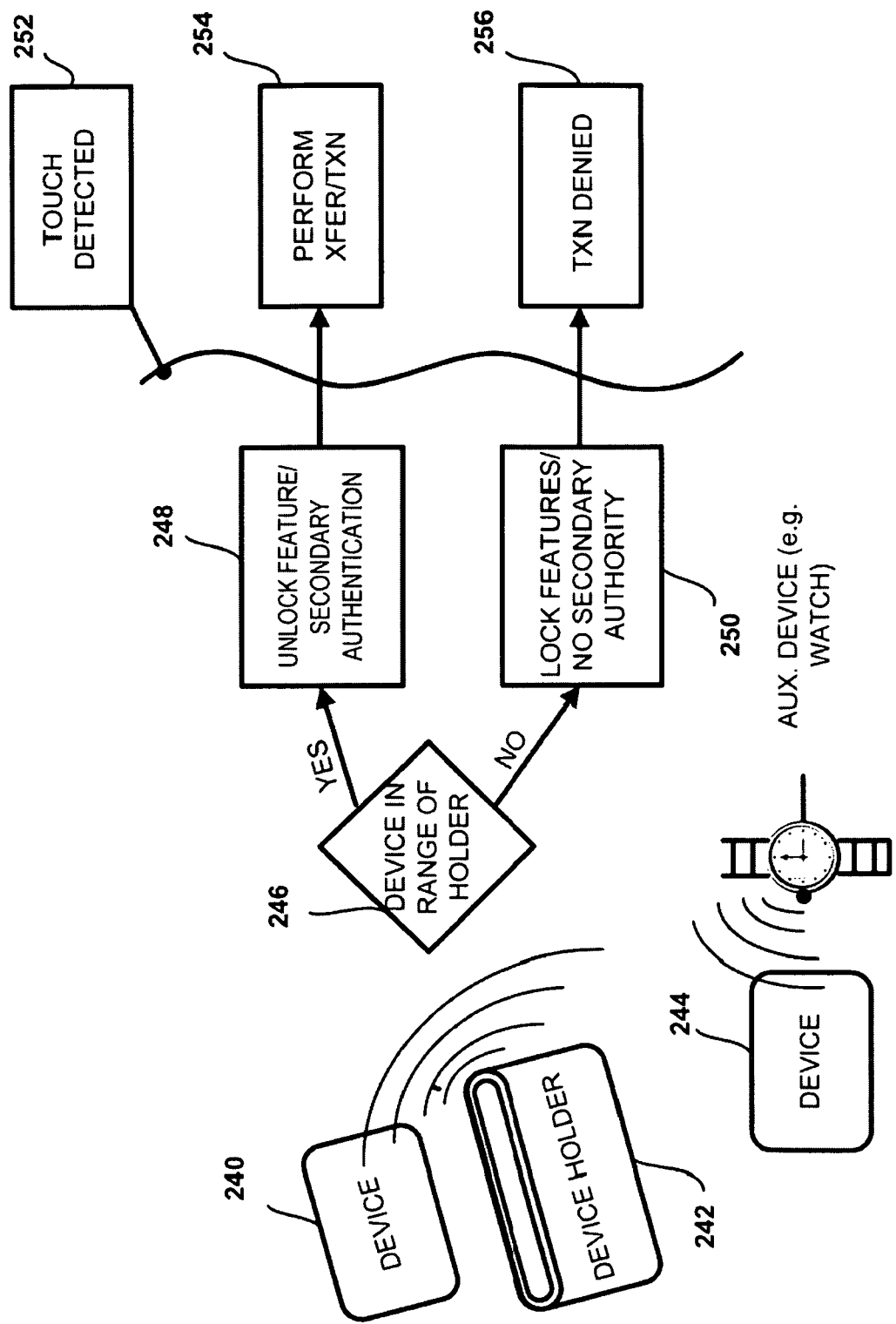

FIG. 2C shows, in accordance with an embodiment or the present invention, a secondary authentication enhancement that may be implemented additionally or alternatively to other security enhancements herein. Secondary authentication refers to authentication using an independent source of authentication data such as the user's own biometric data, passwords or personal identification numbers entered by the user, another independent authentication device, etc. If close contact is detected (block 220) and/or (block 228) of authentication data (blocks 222-226, which are not all inclusive and are only examples) is received, highly secure data transfer may be permitted if all other security enhancements (if they are implemented) that govern the data to be transmitted are also satisfied. Highly secure data may represent, for example, financial data, sensitive contact information, user profile or user account data, etc. On the other hand, some data transfer may be less sensitive and may not require secondary authentication. This is shown in block 230, whereby data transfer is permitted even without secondary authentication. For example, data such as generic contact information may be transmitted. As another example, data collection without transmission may be permitted even without secondary authentication.

Figure 2E:
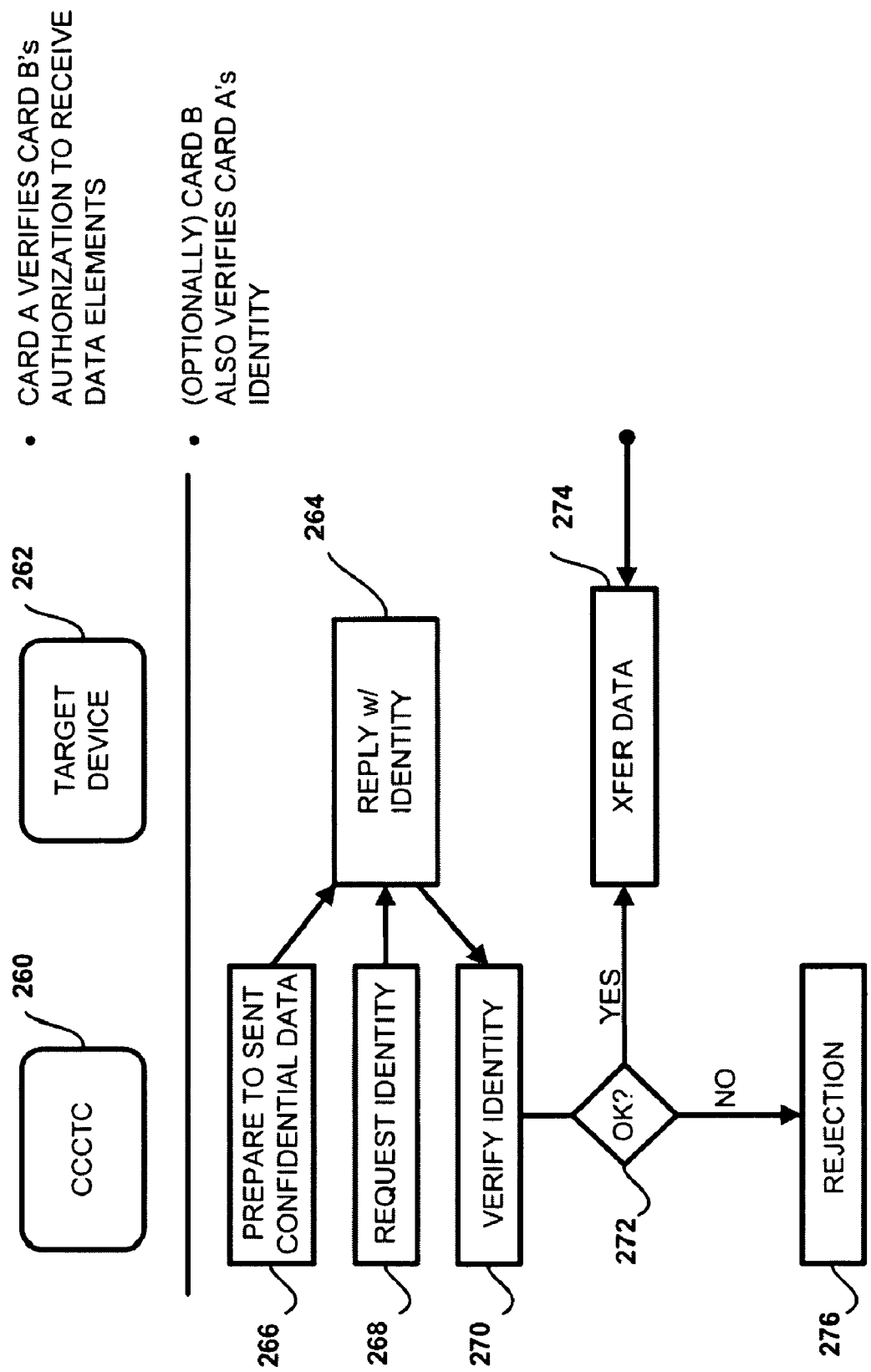
FIG. 2E shows, in accordance with an embodiment of the present invention, a target device verification security enhancement that may be implemented additionally or alternatively to other security enhancements herein.

FIG. 2E shows, in accordance with an embodiment of the present invention, a target device verification security enhancement that may be implemented additionally or alternatively to other security enhancements herein. Prior to transmitting data, the identity of the target device 262 (i.e., the electronic device to which the CCCTC is about to transmit data) is verified. The verification serves to authenticate whether the target device is an appropriate device for receiving the data to be transmitted. The verification may also serve, additionally or alternatively, to ascertain which data items would be appropriate to transfer to the target device 262, based on the target device's identity.

Thus, in block 266, the CCCTC portable wireless device (260) prepares to send data. In block 268, the identity of the target device is requested prior to data transmission. In block 264, the identity of the target device is received. In block 270, the identity of the target is verified. If the verification is satisfactory, data transmission is permitted if all other security enhancements (if they are implemented) that govern the data to be transmitted are also satisfied. As mentioned, the identity of the target device may be employed, in an embodiment, to ascertain which data item(s) would be appropriate for transmission to the target device. For example, a target device that is identified as a cash register may receive credit card data, while a target device that is an access door lock may receive the string that opens the lock. On the other hand, if the identity of the target device cannot be satisfactorily verified by block 272, data transmission is inhibited (block 276).

In accordance with an embodiment of the present invention, a CCCTC companion device security enhancement may be implemented additionally or alternatively to other security enhancements herein. A CCCTC companion device is a device that is paired with the CCCTC portable wireless device for the purpose of inhibiting data transfer should the CCCTC portable wireless device and the CCCTC companion device be separated beyond a given limited range. For example, the CCCTC portable wireless device may be paired with a holder, representing a CCCTC companion device. As another example, the CCCTC portable wireless device may be paired with a wrist watch, or key fob, or a card that may be stored in the user's wallet or purse or pocket. If the CCCTC is directly coupled to its CCCTC companion device (in an embodiment) or is detected to be within a given range of its CCCTC companion device (in another embodiment), key exchange and/or data transmission is permitted if all other security enhancements (if they are implemented) that govern the data to be transmitted are also satisfied.

Figure 2F:
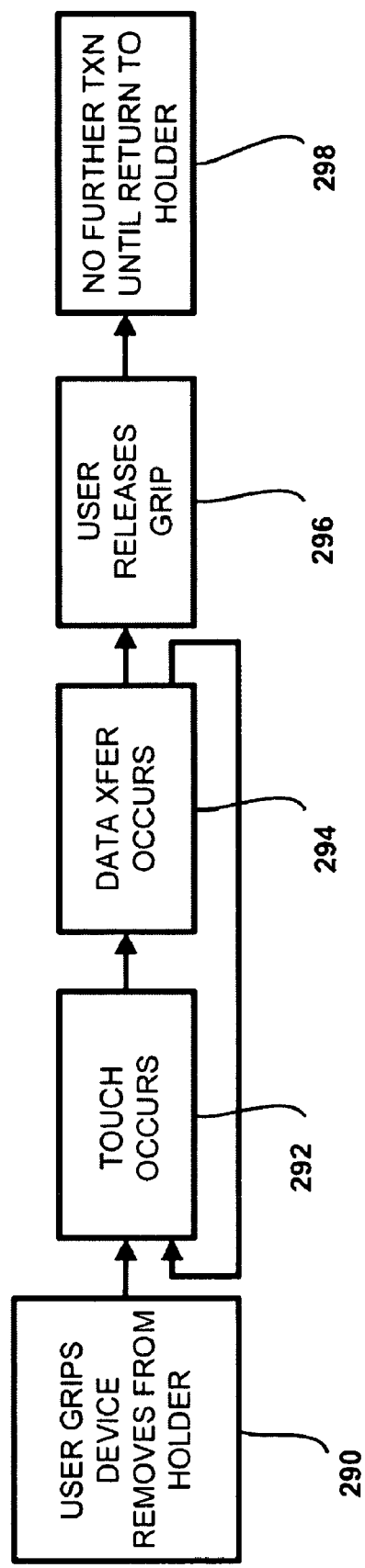
FIG. 2F shows, in accordance with an embodiment of the present invention, a grasp continuity security enhancement that may be implemented additionally or alternatively to other security enhancements herein

FIG. 2F shows, in accordance with an embodiment of the present invention, a grasp continuity security enhancement that may be implemented additionally or alternatively to other security enhancements herein. In this embodiment, data transfer is permitted only if the user continues to maintain a grasp or grip on a selected part or any part of the CCCTC. If the user releases his grasp prior to data transmission, in an embodiment, this data security requirement is not met, and data transfer is inhibited. In another embodiment, if the user releases his grasp during data transmission, the data transmission may be permitted to proceed to completion (in an embodiment) or may be terminated immediately (in an embodiment that implements a higher level of security). In an example, after the user removes the CCCTC from the CCCTC companion holder device, data transfer can nevertheless be inhibited if the user releases his grip on the CCCTC portable wireless device. This is so even if all other security enhancement requirements (e.g., secondary authentication and/or data transfer lime window and/or target device verification) are met. As can be appreciated from the foregoing, this grasp continuity. If the CCCTC is directly coupled to its CCCTC companion device (in an embodiment) or is detected to be within a given range of its CCCTC companion device (in another embodiment), key exchange and/or data transmission is permitted if all other security enhancements (if they are implemented) that govern the data to be transmitted are also satisfied.

Figure 3A:
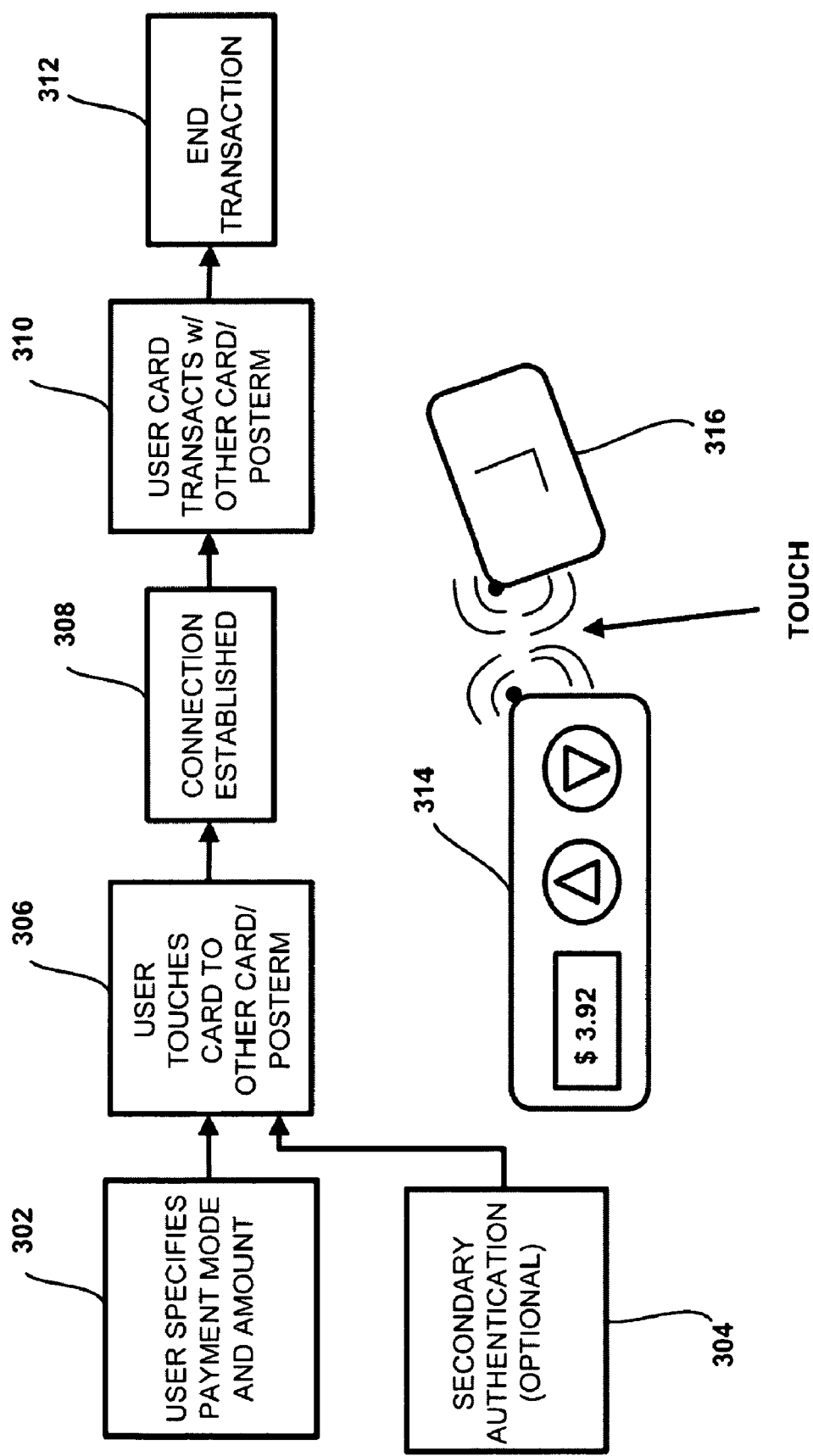
FIG. 3A shows, in accordance with an embodiment of the invention, an example usage scenario wherein the CCCTC portable wireless device is employed to send/receive money.

FIG. 3A shows, in accordance with an embodiment of the invention, an example usage scenario wherein the CCCTC portable wireless device is employed to send/receive money (i.e., data that represents money, including for example credit/debit information). In block 302, the user specifies the payment mode (e.g., debit/credit/which account) and the amount by manipulating an appropriate user input device (e.g., switches, button, touch screen, etc.) on the CCCTC. Secondary authentication may be inputted, as shown by block 304. In block 306, the user may bring the CCCTC into close contact (i.e., direct physical touching or close proximity) to another electronic device, which may represent for example another portable electronic device or a point-of-sale terminal.

In block 308, the connection is established using the methodology discussed in FIG. 1, and may utilize one or more of the security enhancements discussed earlier. In block 310, the CCCTC performs the transaction with the target device (e.g., by transferring money). The transaction ends in block 312. As can be appreciated from the foregoing, the requirement of close contact ensures that money is not transferred unintentionally to a target device. Further, if an encryption key is exchanged via close contact transmission before transaction data is transmitted, the encryption key exchange is highly secure from snooping (due to the close contact requirement for key exchange) and the subsequent data transfer is also highly secure due to the use of the encryption key exchanged during the close contact key exchange.

Figure 3B:
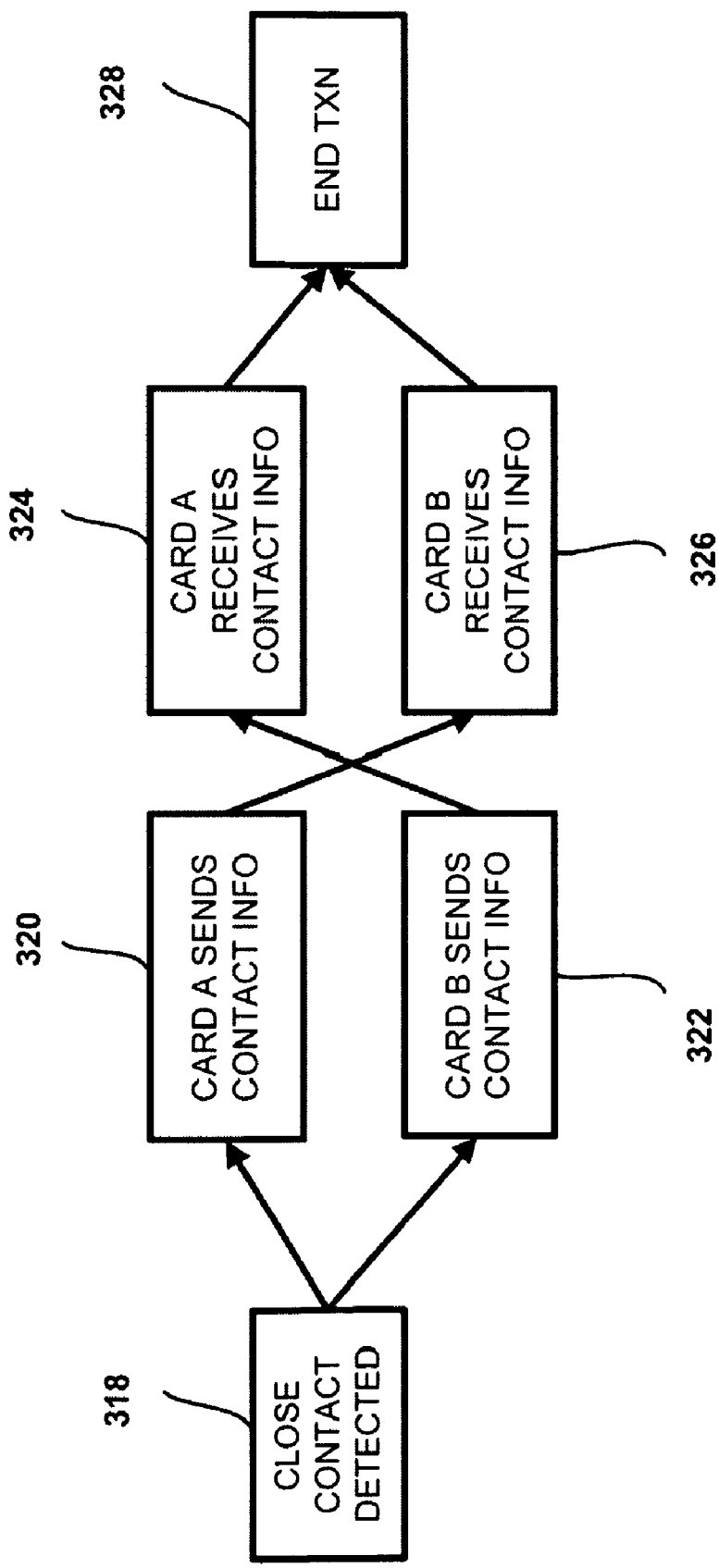
FIG. 3B shows, in accordance with an embodiment of the invention, an example usage scenario wherein the CCCTC portable wireless device is employed to exchange contact information.

FIG. 3B shows, in accordance with an embodiment of the invention, an example usage scenario wherein the CCCTC portable wireless device is employed to exchange contact information. In this example, it is assumed that the contact information is bidirectional between the CCCTC portable wireless device and the target device (which may or may not have the CCCTC capability). However, it should be noted that the contact information may be one-way to or from the CCCTC portable wireless device, as can be appreciated from FIG. 3B. In step 318, the CCCTC detects close contact. Either by the user's own selection of the type of data to be transmitted or by ascertaining the identity of the target device, the appropriate contact data package is selected for transmission. Depending on whether the user regards the contact data to be exchanged as confidential/sensitive, one or more security enhancements may or may not be applied. If no security enhancement is applied, contact data may be exchanged simply by being in close contact with an appropriate target device, for example.

In block 320, card A (the CCCTC portable wireless device in this example) sends the contact information to card B 326 (the target device in this example). The contact data is received in block 326 by card B as shown. In block 322, card B sends the contact data, which is received by card A in block 324. The transaction ends in block 328. Note that either one of block pairs 320/326 and 322/324 represent a one-way data transfer and may be performed without the other, if desired. As can be appreciated from the foregoing, contact data may be conveniently and easily transferred. If the contact data is deemed not confidential/sensitive, the contact data may be transferred by simple close contact. If the contact data is deemed confidential/sensitive, additional security enhancements of the types discussed herein may be applied. In an embodiment, a device ID may be exchanged instead of the contact data itself, which device ID may be employed by the receiving device to look up the full contact data from a networked database at a later time. In this manner, minimal data exchange is required during the actual person-to-person meeting, render it possible to exchange this data even by close contact transmission to ensure freedom from snooping.

Figure 3C:
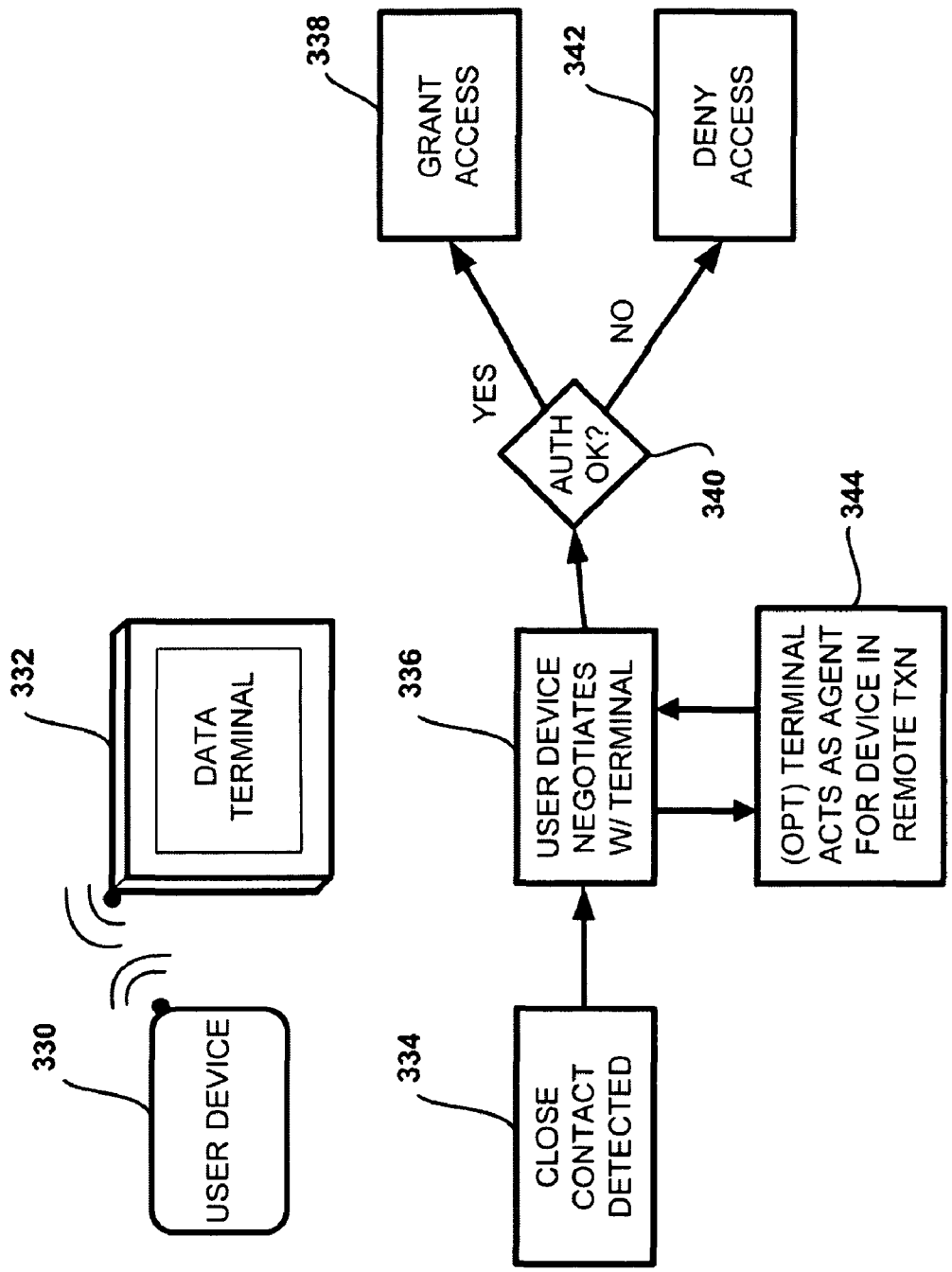
FIG. 3C shows, in accordance with an embodiment of the invention, an example usage scenario wherein the CCCTC portable wireless device is employed to authenticate the user to a data terminal

FIG. 3C shows, in accordance with an embodiment of the invention, an example usage scenario wherein the CCCTC portable wireless device 330 is employed to authenticate the user to a data terminal 332, either to gain access to the data terminal 332 or to gain access to another remote/networked application through the data terminal 332. In block 334, the close contact between the CCCTC and the data terminal 332 is detected by the CCCTC. In block 336, the CCCTC exchanges authentication data to negotiate 336 with the data terminal 332 for access by the user. One or more of the security enhancements discussed herein may be applied prior to authentication data exchange, for example. The data terminal 332 may, as discussed, act as a proxy for a remote/networked application (block 344). If authentication is successful (determined by block 340), access is granted (block 338). Otherwise, access is denied (block 342). As can be appreciated from the foregoing, the close contact initiates the authentication process, substantially eliminating the chance that the data terminal 332 may inadvertently grant access due to an accidental authentication (as may be the case with a wireless authentication device whereby the possibility of inadvertently authenticating with a nearby data terminal may exist)

Figure 3D:
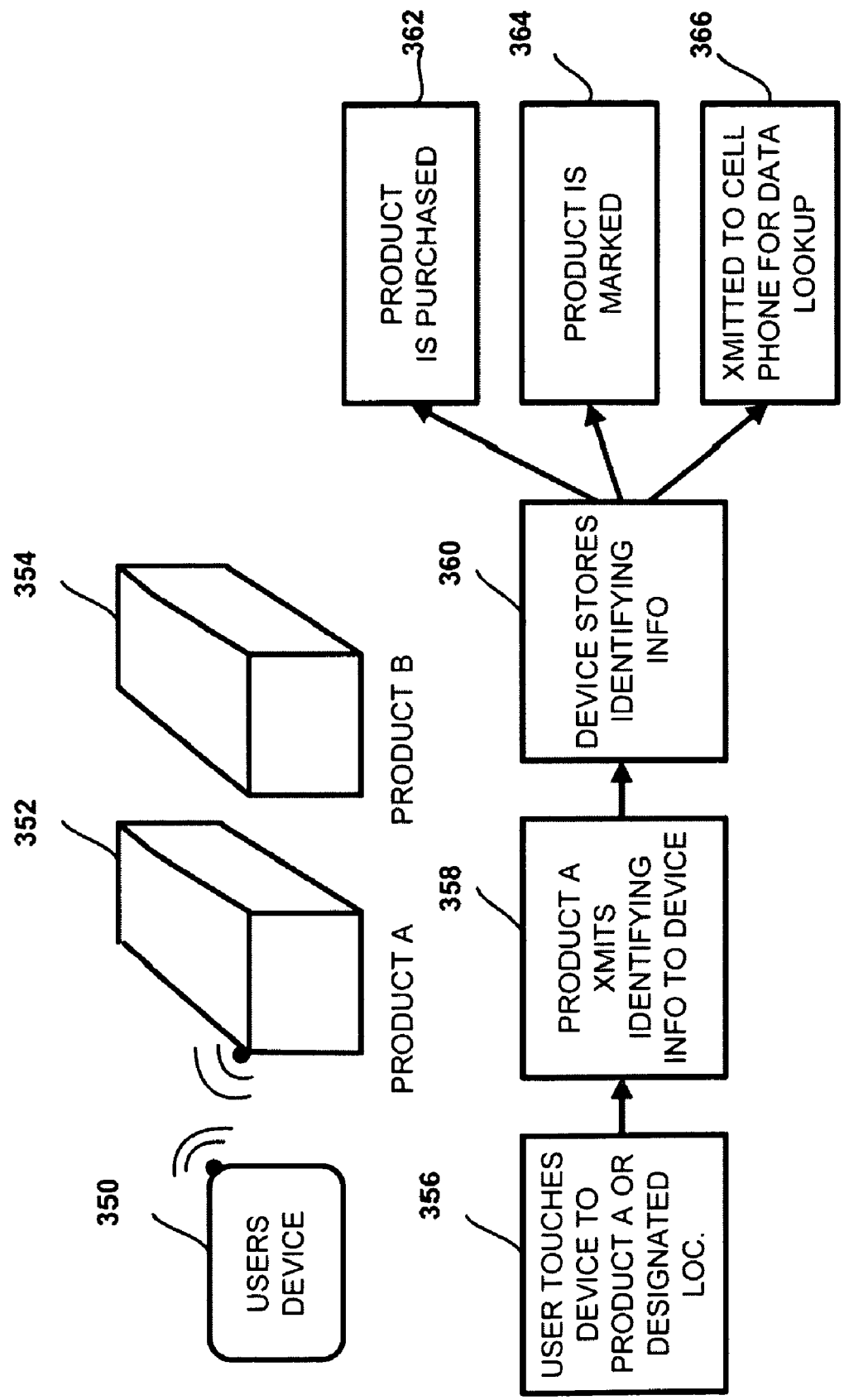
FIG. 3D shows, in accordance with an embodiment of the invention, an example usage scenario wherein the CCCTC portable wireless device is employed to select or mark a product for later transacting.

FIG. 3D shows, in accordance with an embodiment of the invention, an example usage scenario wherein the CCCTC portable wireless device 350 is employed to select or mark a product for later transacting. In block 356, the CCCTC is brought in close contact with the product or a portion thereof. The close contact detection enables the CCCTC to receive product data (block 358) and stores the product data in its memory (block 360). Subsequently, the stored product data may be employed to facilitate a purchase transaction (block 362), to signify that the product is marked for some purposes such as for inventory or for later purchase (block 364), or may be transmitted from the CCCTC to other electronic devices (e.g., an internet server) for data lookup (block 366) (e.g., to perform price comparison).

Figure 3E:
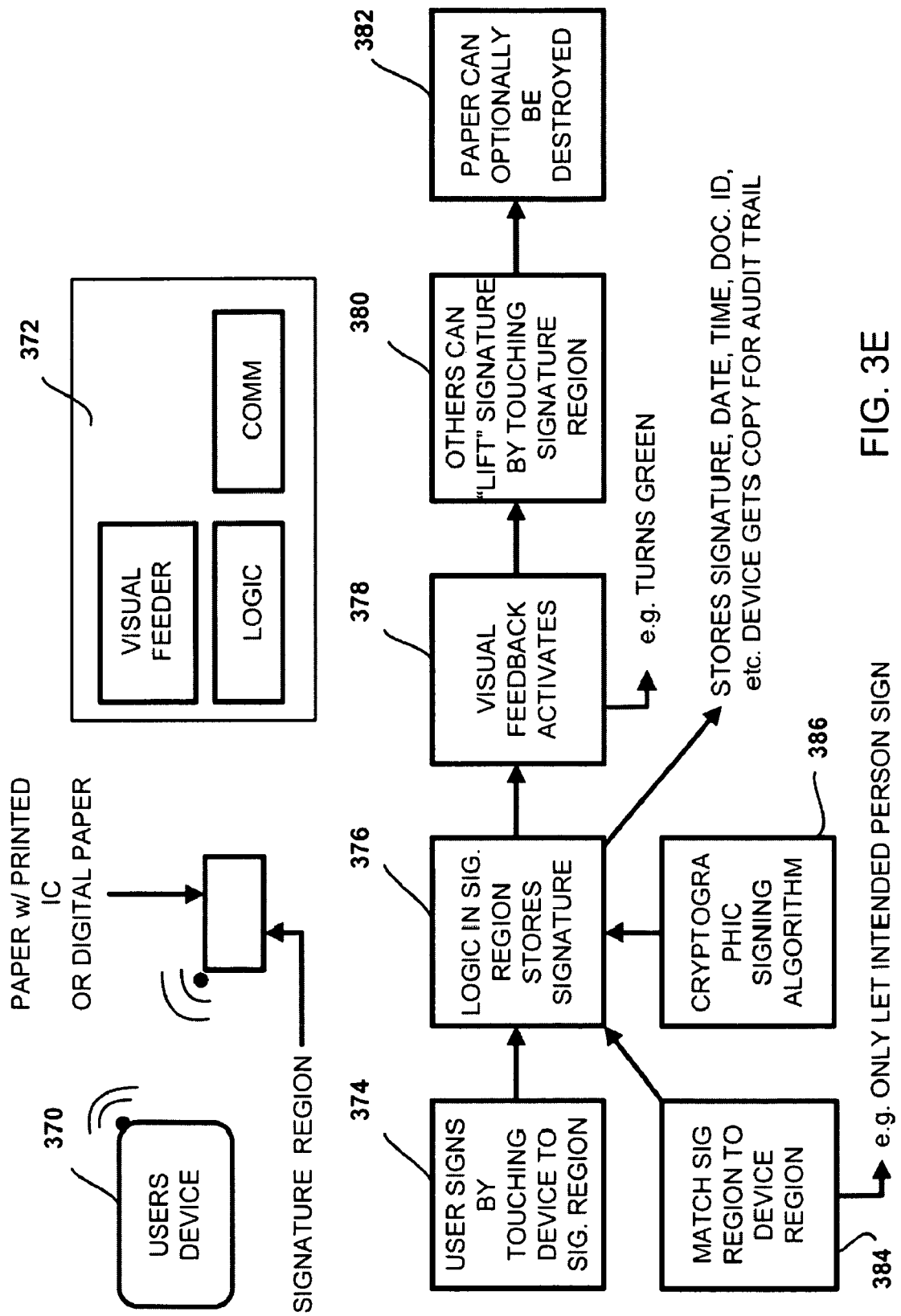
FIG. 3E shows, in accordance with an embodiment of the invention, an example usage scenario wherein the CCCTC portable wireless device is employed to digitally sign documents and optionally to provide an audit trail.

FIG. 3E shows, in accordance with an embodiment of the invention, an example usage scenario wherein the CCCTC portable wireless device 370 is employed to digitally sign documents and optionally to provide an audit trail. Some papers can be printed with a logic region implementing a signature block. This signature block implements a cryptographic signature algorithm (block 386). When the user brings the CCCTC portable wireless device 370 in close contact with the signature region (block 374) and the logic matches the signature in the signature region (block 384) (cryptographically represented) to the signing data presented by the CCCTC portable wireless device 370, signing can occur (block 376).

One or more security enhancements may be applied before signing is permitted, in one or more embodiments. If signing occurs, visual feedback may be provided (block 378) (e.g., the signature block may provide some visual feedback that signing has occurred). Furthermore, the CCCTC portable wireless device 370 may receive data pertaining to the act of signing, the time/date, and the document ID. etc. for auditing purposes. In block 380, the signature may optionally be lifted by a duly authenticated person. For maximum security, the paper can be destroyed after signing (block 382), since the electronic data representing the document and the electronic data representing the act of signing has been stored.

Figure 3F:
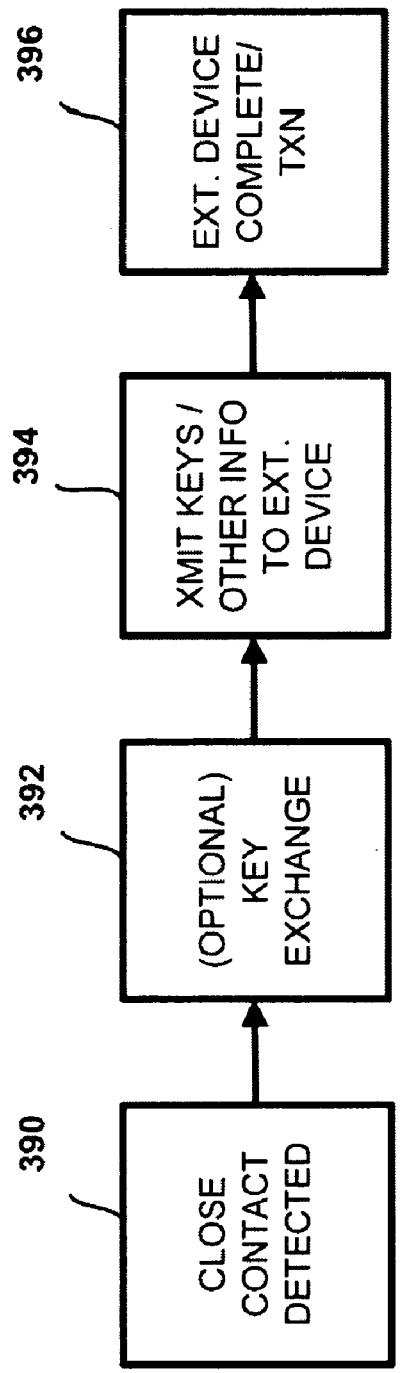
FIG. 3F shows, in accordance with an embodiment of the invention, an example usage scenario wherein the CCCTC portable wireless device is employed as an authentication proxy for another device.

FIG. 3F shows, in accordance with an embodiment of the invention, an example usage scenario wherein the CCCTC portable wireless device is employed as an authentication proxy for another device. For example, if the user wishes to employ a cellular phone or a laptop/desktop computer or any other electronic device (device A) to conduct a transaction with a device B but would prefer the security and convenience of the CCCTC to initiate/authenticate the transaction. In block 390, the close contact between the CCCTC and device B or a proxy for device B (which may be another user's CCCTC portable wireless device or another device that performs authentication on behalf of device B). The close contact allows the authentication to take place in the manner discussed earlier to initiate the transaction. Subsequently, the CCCTC may transfer (block 392/394) the encryption key or some electronic data to device A to allow device A to complete the transaction. The transaction is then completed by the other device (block 396).

Figure 3G:
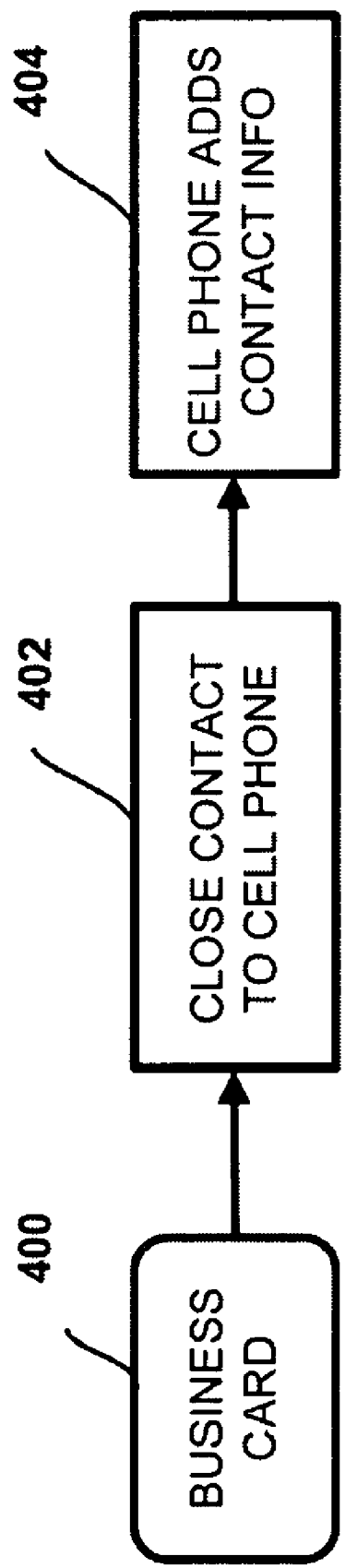
FIG. 3G shows, in accordance with an embodiment of the invention, an example usage scenario wherein the CCCTC portable wireless device is embedded in a physical business card.

FIG. 3G shows, in accordance with an embodiment of the invention, an example usage scenario wherein the CCCTC portable wireless device is embedded in a physical business card to allow the physical business card having data transmit circuitry to transmit personal contact data (e.g., name, phone number, email address, etc.) upon close contact to another electronic device, such as a cellular phone or another information manager device. Alternatively, FIG. 3G may represent the reverse situation whereby the CCCTC portable wireless device is embedded in an electronic device, such as a cellular phone, to enable the electronic device to receive personal contact data upon close contact with a business card having digital data transmit capability. In block 402, the business card (400) is bought in close contact with the cellular phone. The close contact allows personal contact data to be transmitted from the business card's data transmit circuitry to the cellular phone, and the cellular phone may update its contact database with the newly acquired data (404).

Figure 3H:
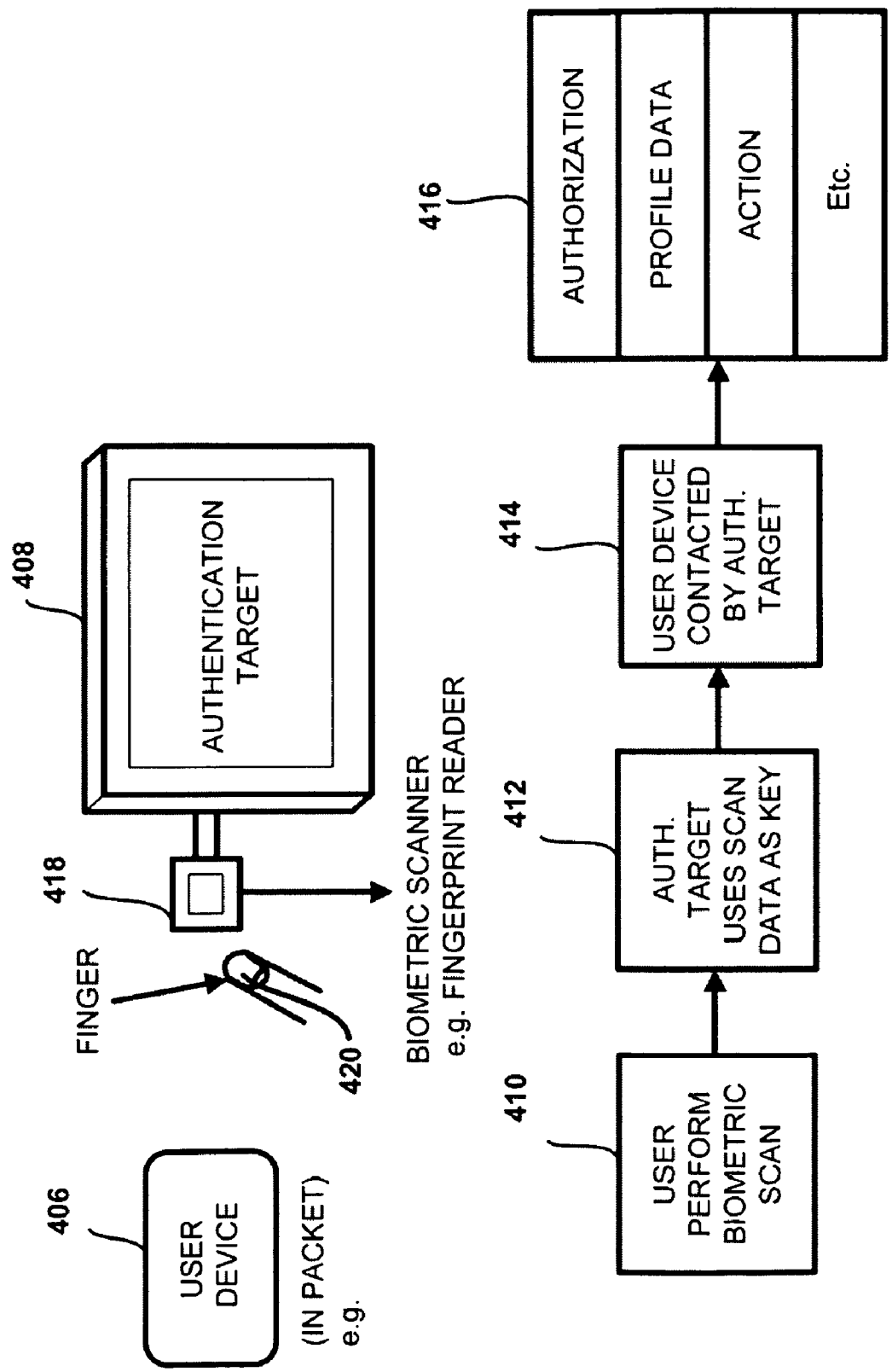
FIG. 3H shows, in accordance with an embodiment of the invention, an example usage scenario wherein the touching drives a biometric scanner to acquire biometric data.

FIG. 3H shows, in accordance with an embodiment of the invention, an example usage scenario wherein the touching drives a biometric scanner (418) to acquire biometric data (block 420) (such as a fingerprint). The biometric data is then scanned (block 410) and employed by the authentication target device (408) (e.g., a computer that the user is trying to access) to generate the key using at least a portion of the biometric data. The authentication target (408) may then contact (block 414) a user authentication device (406), which may be located within wireless communication distance to the authentication target device (408). By exchanging the key with the user authentication device (408), the authentication target device (408) may be authenticated, and user access may be provided.

Figure 3I:
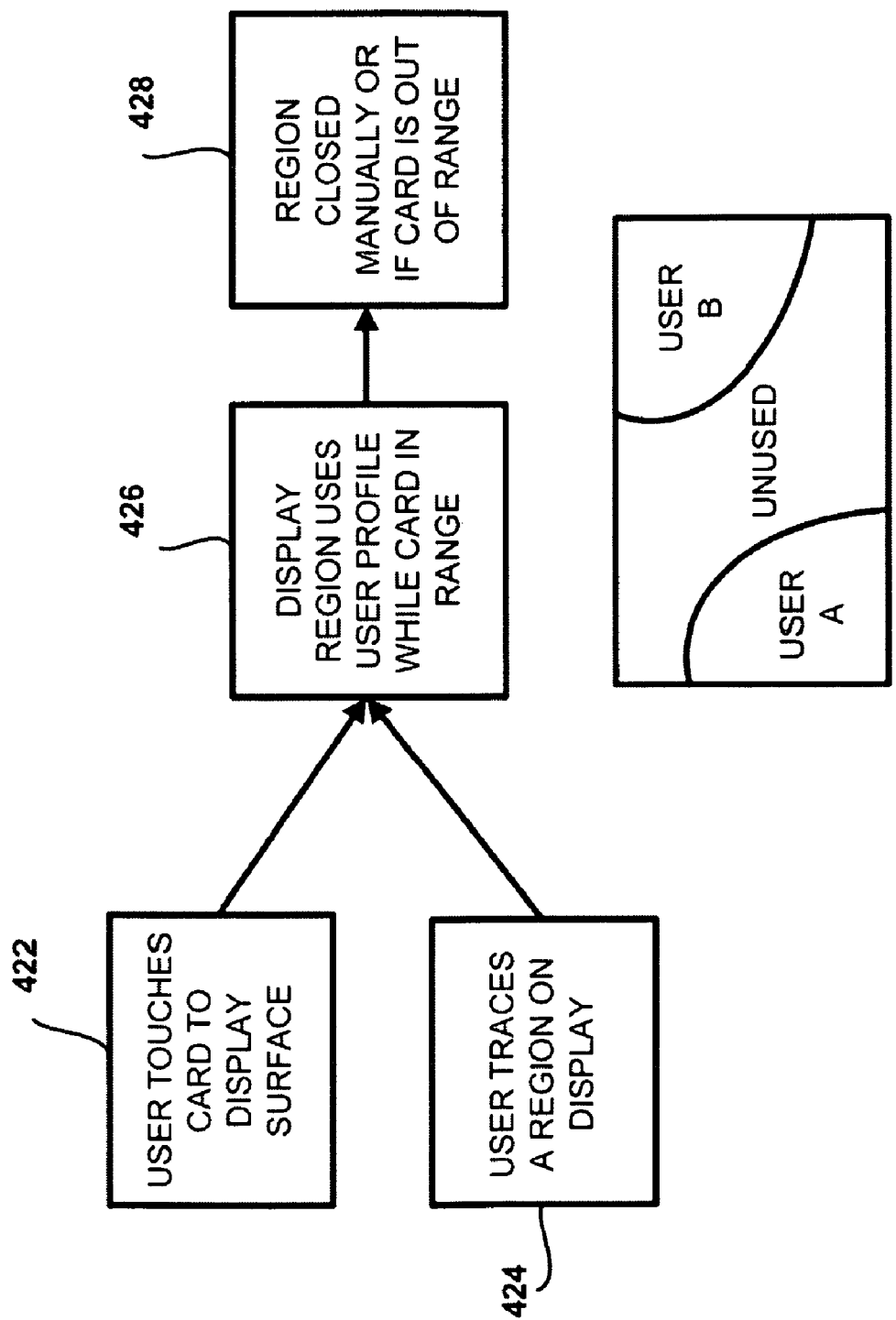
FIG. 3I shows, in accordance with an embodiment of the invention, an example usage scenario wherein the close contact enables at least a portion of a display surface to be allocated for displaying the user's own data.

FIG. 3I shows, in accordance with an embodiment of the invention, an example usage scenario wherein the close contact enables at least a portion of a display surface (such as touch-sensitive display screen) to be allocated for displaying the user's own data (which may be obtained at least in part from the data stored in the CCCTC portable wireless device and wirelessly transmitted to the display screen. In block 422, the user brings the CCCTC portable wireless device into close contact with a display device. This close contact, if all authentication and security requirements are satisfied, registers the user with the display and allows the display to receive data from the CCCTC portable wireless device for the purpose of displaying such data on the screen. Alternatively, the data can be obtained from another user device (such as a key fob) after the CCCTC portable wireless device finishes the authentication/initiation. The user can then optionally trace a region on the display screen (424), using either the CCCTC portable wireless device or another physical item (a pencil, a finger, etc.). Multiple users may claim different regions of a given display, for example, to share the display. The display region allotted to the user then displays the data received from the user's device or from the CCCTC portable wireless device. Such data may include, for example, email, IMs, and any other type of digital data that the user may wish to display. Once the user is finished, the user may manually close the display by touching an appropriate icon or turning off a switch. In an embodiment, the display only shows the user's data while the display is in range (block 426) of the CCCTC portable wireless device. If the user moves away (and thus the CCCTC portable wireless device moves away) from the display, the display region allotted to the user closes, and the user data is no longer displayed (block 428).

Figure 3J:
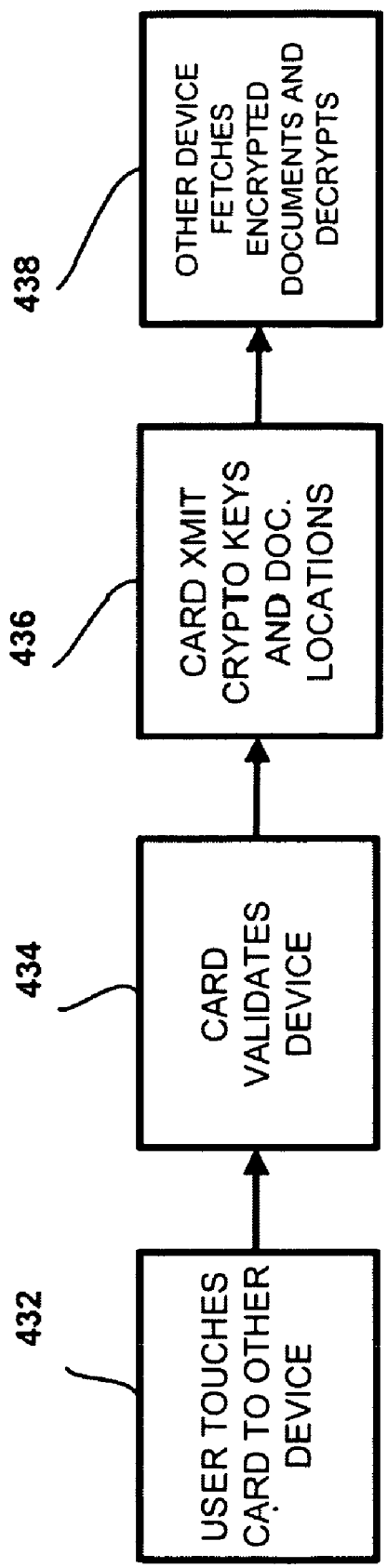
FIG. 3J shows, in accordance with an embodiment of the invention, an example usage scenario wherein the CCCTC methodology is employed to facilitate the transmission of highly sensitive document.

FIG. 3J shows, in accordance with an embodiment of the invention, an example usage scenario wherein the CCCTC methodology is employed to facilitate the transmission of highly sensitive document. In step 432, the user brings the CCCTC portable wireless device into close contact with a target device. The target device represents the device that the user intends to receive the document. The target device may also represent a proxy for the device that will fetch the device at a later time, as discussed later herein. At any rate, the close contact allows the CCCTC portable wireless device to authenticate the target device. In an embodiment, the document information, including its location on the internet and the identity of the intended target device, is stored in the CCCTC. With this information, the CCCTC can validate whether the target device is the intended recipient of the document information (434).

In step 436, assuming that the target device is the intended recipient, the CCCTC portable wireless device transmits one or more cryptographic keys that may be used to decrypt the document, along with the location information for retrieving the encrypted document from the network (e.g., a LAN or the internet). Since this transmission occurs in close contact, or is facilitated by the encryption key that is exchanged while in close contact, data security risk due to snooping is substantially eliminated.

In step 438, the target device or the device for which the target device acts as a proxy fetches the encrypted document using the location transmitted by the CCCTC portable wireless device, and then decrypt the fetched, encrypted document using the provided cryptographic key. In this manner, it is not necessary, in an embodiment, to carry the document in the CCCTC portable wireless device while still enabling highly secure document retrieval.

As can be appreciated from the foregoing, embodiments of the invention employ close contact detection (either direct physical contact detection or close proximity detection) to act as a trigger for data transmission. This close contact detection minimizes the possibility that wireless data transmission takes place without the user's conscious knowledge or intention. Furthermore, some highly sensitive information (such as cryptographic keys) may be exchanged while in close contact (either by direct contact transmission or by very short range wireless transmission), thereby substantially eliminating the security risks due to unwanted snooping by a third party. Once the highly secret encryption keys are securely exchanged, subsequent transmission may be made more secure, even if accomplished over longer distance wirelessly. Various security enhancements are provided to ensure that data transfer is highly secure, following the close contact detection, in various usage scenarios discussed herein.

While this invention has been described in terms of several embodiments, there are alterations, permutations, and equivalents, which fall within the scope of this invention. Also, the title, summary, and abstract are provided herein for convenience and should not be used to construe the scope of the claims herein. Further, in this application, a set of "n" refers to one or more "n" in the set. It should also be noted that there are many alternative ways of implementing the methods and apparatuses of the present invention. It is therefore intended that the specification be interpreted as including all such alterations, permutations, and equivalents as fall within the true spirit and scope of the present invention.

What is claimed is:

1. A portable wireless device for conducting at least part of an electronic transaction with a target electronic device, said portable wireless device comprising:

a detector configured to ascertain whether said portable wireless device is in close proximity with said target electronic device such that said portable wireless device is within a range from said target electronic device;

a data transmission circuit configured for transmitting data between said portable wireless device and said target electronic device if said close proximity is detected;

logic for recognizing authorization, said recognizing said authorization being triggered by that said portable wireless device is ascertained to be within said range from said target electronic device, said authorization enabling said data transmission circuit to perform data transfer between said portable wireless device and said target electronic device with said portable wireless device being subsequently located beyond said range from said target electronic device, said data transfer being inhibited without said authorization being recognized by said portable wireless device;

logic for automatically determining context of communication associated with said transmitting based on received data received from said target electronic device; and logic for automatically selecting response information based on said context of said communication, said response information including at least one of financial transaction information, personal contact information, and access code information, wherein said data transmission circuit is further configured to provide said response information to said target electronic device in response to said received data.

2. The portable wireless device of claim 1 further comprising:

logic for presenting signing data; and logic for matching a cryptographically represented signature to said signing data, said cryptographically represented signature being located in a signature region of said target device.

3. The portable wireless device of claim 1 wherein said detector ascertains said close proximity based on at least one of a change in impedance and a change in current.

4. The portable wireless device of claim 1 wherein said detector ascertains said close proximity based on a change in voltage.

5. The portable wireless device of claim 1 wherein said detector ascertains said close proximity based on a change in radio signals.

6. The portable wireless device of claim 1 further comprising authenticating a user of said portable wireless device prior to said data transfer.

7. The portable wireless device of claim 1 further comprising logic for selecting a profile, wherein said data transmission circuit is further configured for sending data specified by said profile from said portable wireless device to said target electronic device.

8. The portable wireless device of claim 1 wherein said close proximity is a direct touch between said portable wireless device and said target electronic device.

9. The portable wireless device of claim 1 wherein said close proximity is deemed to have achieved if said portable wireless device is less than four inches from said target device and is more than 0.1 inch from said target device.

10. A method for conducting at least part of an electronic transaction between a portable wireless device and a target electronic device, said method comprising:

ascertaining, using at least said portable wireless device, whether said portable wireless device is in close proximity with said target electronic device such that said portable wireless device is within a range from said target electronic device;

before said portable wireless device is ascertained to be within said range from said target electronic device, inhibiting data transfer between said portable wireless device and said target electronic device;

after said portable wireless device has been ascertained to be within said range from said target electronic device, triggering at least said portable wireless device to recognize authorization, said authorization allowing said data transfer between said portable wireless device and said target electronic device to be performed with said portable wireless device being located beyond said range from said target electronic device;

after said triggering, performing said data transfer with said portable wireless device being located beyond said range from said target electronic device;

determining context of communication associated with said data transfer based on received data received from said target electronic device, said determining being automatically performed by said portable wireless device;

selecting response information based on said context of said communication, said response information including at least one of financial transaction information, personal contact information, and access code information, said selecting being automatically performed by said portable wireless device; and providing said response information from said portable wireless device to said target electronic device in response to said received data.

11. The method of claim 10 further comprising ascertaining said close proximity based on a change in current.

12. The method of claim 10 further comprising ascertaining said close proximity based on a change in impedance.

13. The method of claim 10 further comprising ascertaining said close proximity based on a change in voltage.

14. The method of claim 10 further comprising ascertaining said close proximity based on a change in radio signals.

15. The method of claim 10 further comprising authenticating a user of said portable wireless device prior to said data transfer.

16. The method of claim 10 further comprising:
selecting a profile; and
sending data specified by said profile from said portable wireless device to said target electronic device.

17. The method of claim 10 wherein said close proximity is a direct touch between said portable wireless device and said target electronic device.

18. The method of claim 10 wherein said close proximity is deemed to have achieved if said portable wireless device is less than four inches from said target device and is more than 0.1 inch from said target device.

19. The method of claim 10 wherein said target device represents a point-of-sale terminal.

20. The method of claim 10 further comprising matching a cryptographically presented signature to signing data, said cryptographically presented signature being located in a signature region of said target device, said signing data being presented by said portable wireless device.

* * * * *